(12) United States Patent
Ling et al.

(10) Patent No.: US 10,635,881 B2
(45) Date of Patent: Apr. 28, 2020

(54) DISPLAY PANEL

(71) Applicant: Shanghai Oxi Technology Co., Ltd, Shanghai (CN)

(72) Inventors: Yan Ling, Shanghai (CN); Hong Zhu, Shanghai (CN)

(73) Assignee: SHANGHAI OXI TECHNOLOGY CO., LTD, Shanghai (CN)

( * ) Notice: Subject to any disclaimer, the term of this patent is extended or adjusted under 35 U.S.C. 154(b) by 169 days.

(21) Appl. No.: 15/741,346

(22) PCT Filed: Feb. 15, 2017

(86) PCT No.: PCT/CN2017/073621
§ 371 (c)(1),
(2) Date: Jan. 2, 2018

(87) PCT Pub. No.: WO2018/036108
PCT Pub. Date: Mar. 1, 2018

(65) Prior Publication Data
US 2019/0286870 A1     Sep. 19, 2019

(30) Foreign Application Priority Data
Aug. 22, 2016 (CN) .......................... 2016 1 0703967

(51) Int. Cl.
*G06K 9/00* (2006.01)
*G02B 27/30* (2006.01)
*G06F 1/16* (2006.01)

(52) U.S. Cl.
CPC .......... *G06K 9/0004* (2013.01); *G02B 27/30* (2013.01); *G06F 1/1643* (2013.01); *G06K 9/00* (2013.01)

(58) Field of Classification Search
CPC ...... G06K 9/0004; G02B 27/30; G06F 1/1643
See application file for complete search history.

(56) References Cited

U.S. PATENT DOCUMENTS 9,964,436 B1 * 5/2018 Chung ................. G01J 1/0437
9,992,843 B2 * 6/2018 Couch .................... H04W 4/06
(Continued)

FOREIGN PATENT DOCUMENTS

CN     104881195 A    9/2015
CN     104881196 A    9/2015
(Continued)

OTHER PUBLICATIONS

International Search Report and Written Opinion from PCT/CN2017/073621 dated Aug. 22, 2016.
(Continued)

*Primary Examiner* — Utpal D Shah
(74) *Attorney, Agent, or Firm* — Adsero IP

(57) ABSTRACT

A display panel is provided, including: a display region including a plurality of self-luminous display pixels configured in array, wherein the display region includes at least one optical fingerprint sensing region, wherein at least one optical fingerprint sensing element is configured in each pixel among k self-luminous display pixels in every group of m by n self-luminous display pixels in every optical fingerprint sensing region, where m and n are any integers no less than 1, and k is any integer from 1 to m by n. Functions of the display panel are strengthened, and performance of the functions is improved.

18 Claims, 5 Drawing Sheets

(56) References Cited

U.S. PATENT DOCUMENTS

| | | | |
|---|---|---|---|
| 10,021,758 B2 * | 7/2018 | Coombes | H05B 33/0845 |
| 10,108,839 B2 * | 10/2018 | Uehara | G06F 3/041 |
| 10,122,899 B2 * | 11/2018 | Chung | H04N 5/2252 |
| 10,162,462 B2 * | 12/2018 | Shen | G06F 3/0416 |
| 10,181,070 B2 * | 1/2019 | Smith | G02B 5/005 |
| 10,211,362 B2 * | 2/2019 | Qiu | A61B 5/742 |
| 10,216,975 B1 * | 2/2019 | He | G06K 9/2018 |
| 10,282,579 B2 * | 5/2019 | Thompson | G06F 21/81 |
| 10,318,791 B2 * | 6/2019 | He | G02B 6/0026 |
| 10,325,133 B2 * | 6/2019 | Ghavanini | G06F 3/0412 |
| 10,325,134 B2 * | 6/2019 | Andersson | G06K 9/209 |
| 10,325,142 B2 * | 6/2019 | He | G06K 9/0012 |
| 10,331,939 B2 * | 6/2019 | He | G06K 9/00087 |
| 2007/0216657 A1 | 9/2007 | Konicek | |
| 2017/0115811 A1 | 4/2017 | Yang | |
| 2017/0147850 A1 | 5/2017 | Liu | |

FOREIGN PATENT DOCUMENTS

| | | |
|---|---|---|
| CN | 104934008 A | 9/2015 |
| CN | 105702176 A | 6/2016 |
| CN | 105760014 A | 7/2016 |
| CN | 105809141 A | 7/2016 |
| CN | 105868742 A | 8/2016 |
| CN | 106295611 A | 1/2017 |
| WO | WO 2017/07362147 A | 1/2017 |

OTHER PUBLICATIONS

Office Action from App No. 201610703967.5 dated Jan. 22, 2019 (with English translation).

\* cited by examiner

DISPLAY PANEL

CROSS-REFERENCE TO RELATED APPLICATIONS

This application is the national phase of International Application No. PCT/CN2017/073621, filed on Feb. 15, 2017, which claims the benefit of priority to Chinese Patent Application No. 201610703967.5, filed on Aug. 22, 2016, and entitled "DISPLAY PANEL", the entire disclosure of which are incorporated herein by reference.

TECHNICAL FIELD

The present disclosure generally relates to photoelectric display field, and more particularly, to a display panel.

BACKGROUND

Display panels are generally used to display output information of electronic products. Existing display panels used in mobile terminals, such as mobile phones, are usually provided with a finger touch sensing layer.

In all types of display layer, self-luminous display panel is an important development trend of the current display panels as it does not require a backlight source and is advantageous in weight, size and power consumption.

However, on one hand, the existing display panels' function is relatively single; on the other hand, when being integrated with structures with other functions, structures of the existing display panels need to be optimized.

SUMMARY

In embodiments of the present disclosure, a display panel is provided to strengthen functions of the display panel and cooperation between different functions of the display panel.

In an embodiment of the present disclosure, a display panel is provided, including: a display region including a plurality of self-luminous display pixels configured in array, wherein the display region includes at least one optical fingerprint sensing region, wherein at least one optical fingerprint sensing element is configured in each pixel among k self-luminous display pixels in every group of m by n self-luminous display pixels in every optical fingerprint sensing region, where m and n are any integers no less than 1, and k is any integer from 1 to m to by n.

Optionally, one optical fingerprint sensing element is configured in each pixel among k self-luminous display pixels in every group of m by n self-luminous display pixels, where at least one of in and n is greater than 1, k is less than in by n, and an area of the self-luminous display pixel may be smaller than 30 μm by 30 μm.

Optionally, both m and n are 2, and k is 1.

Optionally, one optical fingerprint sensing element is configured in each pixel among k self-luminous display pixels in every group of m by n self-luminous display pixels, where in, n and k are 1, and an area of the self-luminous display pixel may be within a range from 30 μm by 30 μm to 70 μm by 70 μm.

Optionally, k is m by n, at least two optical fingerprint sensing elements are configured in at least one pixel among k self-luminous display pixels in every group of in by n self-luminous display pixels, and an area of the self-luminous display pixel may be larger than 70 μm by 70 μm.

Optionally, four or eight optical fingerprint sensing elements are configured in the at least one pixel.

Optionally, each of the plurality of self-luminous display pixels may include at least three sub-pixels, and the optical fingerprint sensing element may be disposed in the sub-pixel.

Optionally, one optical fingerprint sensing element is configured in every pixel among k self-luminous display pixels in every group of in by n self-luminous display pixels, where at least one of m and n is greater than 1, k is less than m by n, and an area of the sub-pixel may be smaller than 10 μm by 30 μm.

Optionally, both m and n are 2, and k is 1.

Optionally, one optical fingerprint sensing element is configured in every pixel among k self-luminous display pixels in every group of m by n self-luminous display pixels, where in, n and k are 1, and an area of the sub-pixel may be within a range from 30 μm by 10 μm to 23 μm by 70 μm.

Optionally, k is m by n, at least two optical fingerprint sensing elements are configured in at least one pixel among k self-luminous display pixels in every group of m by n self-luminous display pixels, and an area of the sub-pixel may be larger than 23 μm by 70 μm.

Optionally, four or eight optical fingerprint sensing elements are configured in at least one pixel among k self-luminous display pixels in every group of m by n self-luminous display pixels.

Optionally, each of the plurality of self-luminous display pixels may include at least three sub-pixels, and the optical fingerprint sensing element may be disposed outside the sub-pixel.

Optionally, the display region may include one optical fingerprint sensing region, and an area of the display region may be equal to an area of the optical fingerprint sensing region.

Optionally, an area of the optical fingerprint sensing region may be smaller than an area of the display region and within a range from 25 mm$^2$ to 400 mm$^2$.

Optionally, when the optical fingerprint sensing region acquires a fingerprint signal, at least a portion of the self-luminous display pixels may give out light to provide light as a light source.

Optionally, the display panel may further include a first substrate and a second substrate facing the first substrate, wherein the first substrate is close to a press surface of a user finger, and at least one of an upper surface and a lower surface of the first substrate is provided with a touch sensing layer.

Optionally, the display panel may further include a first substrate and a second substrate facing the first substrate, wherein the first substrate is close to a press surface of a user finger, and a light collimation layer is disposed between the first substrate and the optical fingerprint sensing element.

Embodiments of the present disclosure may provide following advantages. In embodiments of the present disclosure, the optical fingerprint sensing elements are formed in the self-luminous display pixels. Therefore, the optical fingerprint sensing elements may be used to acquire a fingerprint image, so as to realize a fingerprint recognition function. In this way, the display panel functions normally in display as well as fingerprint recognition.

Further, when the optical fingerprint sensing region acquires a fingerprint signal, at least a portion of the self-luminous display pixels give out light to provide light as a light source. That is to say, the self-luminous display pixels are used to provide light required by fingerprint acquisition of the optical fingerprint sensing elements, so that a display function and a fingerprint recognition function of the display panel cooperate with each other, and the display function may directly assist the implementation of the fingerprint recognition function. In this way, in a structure with integration of the display function and the fingerprint recognition function, structures, such as a light source or a light guiding plate, required by a fingerprint recognition function module may be simplified, which may simplify an integral structure of the display panel with the fingerprint recognition function, improve an integration level of the display panel, and optimize the integral structure of the display panel after integration.

Further, the optical fingerprint sensing elements may be disposed only in a portion of the self-luminous display pixels rather than all the self-luminous display pixels, which may save process cost and simplify structures. Besides, by disposing the optical fingerprint sensing elements only in a portion of the self-luminous display pixels, display effect of the display panel may be better, that is, the display function of the display panel may be better. Besides, with decreased optical fingerprint sensing elements, a fingerprint image acquisition rate may be improved, and power consumption may be lower.

Further, a plurality of optical fingerprint sensing elements may be disposed in one self-luminous display pixel, so as to make acquired fingerprint images have a relatively great resolution when an area of the self-luminous display pixel is relatively large, which enables well cooperation of the fingerprint recognition function and the display function.

DETAILED DESCRIPTION

As described in the background, the existing display panels' function is still relatively simple, and when being integrated with structures with other functions, structures of the existing display panels need to be optimized.

Therefore, embodiments of the present disclosure provide a display panel. The display panel possesses a fingerprint acquisition function and an optimized integral structure, so that functions of the display panel are strengthened, and a application coverage of the display panel may be relatively wide.

In order to clarify the object, characteristic and advantages of embodiments of the present disclosure, embodiments of present disclosure will be described clearly in detail in conjunction with accompanying drawings.

Figure 1:
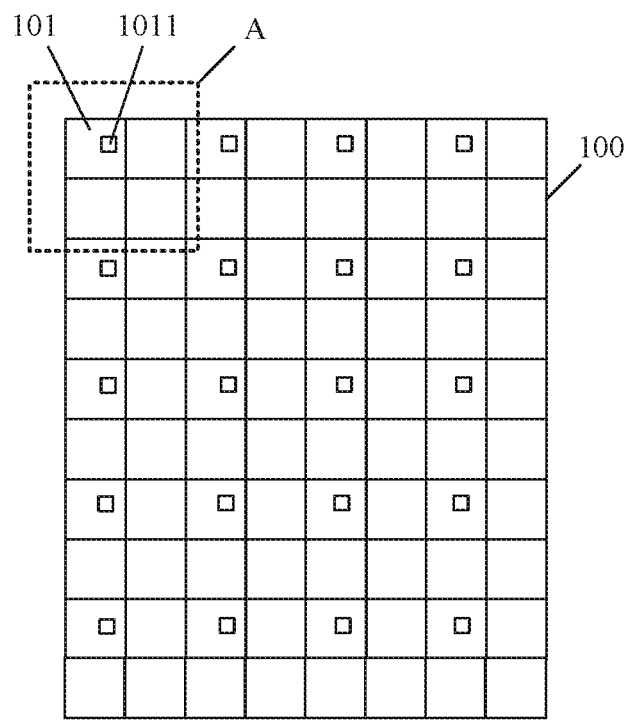
FIG. 1 schematically illustrates a diagram of a display panel according to an embodiment.

In an embodiment, a display panel is provided. Referring to FIG. 1, the display panel includes a display region 100 which includes one optical fingerprint sensing region (not labeled in FIG. 1). In some embodiments, an area of the optical fingerprint sensing region may be equal to an area of the display region 100. That is, a region where the display region 100 is located is that where the optical fingerprint sensing region is located.

Still referring to FIG. 1, the display region 100 includes a plurality of self-luminous display pixels 101 arranged in array. In some embodiments, one optical fingerprint sensing element 1011 is configured in one self-luminous display pixel 101 in every group of 2 by 2 self-luminous display pixels 101. In FIG. 1, a dotted box A encloses a group of 2 by 2 self-luminous display pixels 101 for highlighting.

In some embodiments, each self-luminous display pixel 101 may be a single pixel, that is, the self-luminous display pixel 101 may not include a sub-pixel. The optical fingerprint sensing elements 1011 may be disposed in a suitable position in the self-luminous display pixels 101.

In some embodiments, each self-luminous display pixel may include multiple sub-pixels, such as three or four sub-pixels. The optical fingerprint sensing elements may be disposed outside or inside the sub-pixels.

From above, the optical fingerprint sensing elements 1011 may be uniformly disposed in the self-luminous display pixels 101 of the display region 100. It could be understood that, the optical fingerprint sensing elements 1011 are also arranged in array. Particularly, in some embodiments, each optical fingerprint sensing elements 1011 is disposed in a first pixel of 2 by 2 self-luminous display pixels 101, i.e., the self-luminous display pixels 101 at a top left corner.

In the display panel provided by the embodiments of the present disclosure, the optical fingerprint sensing elements 1011 are formed in the self-luminous display pixels 101. Therefore, the optical fingerprint sensing elements 101 may be used to acquire a fingerprint image, so as to realize a fingerprint recognition function. In this way, the display panel functions normally in display as well as fingerprint recognition.

Further, when the optical fingerprint sensing region acquires a fingerprint signal, at least a portion of the self-luminous display pixels 101 serve as a light source. That is to say, the self-luminous display pixels 101 are used to provide light required by fingerprint acquisition of the optical fingerprint sensing elements 1011, so that a display function and a fingerprint recognition function of the display panel cooperate with each other, and the display function may directly assist the implementation of the fingerprint recognition function. In this way, in a structure with integration of the display function and the fingerprint recognition function, structures, such as a light source or a light guiding plate, required by a fingerprint recognition function module may be simplified, which may simplify an integral structure of the display panel with the fingerprint recognition function, improve an integration level of the display panel, and optimize the integral structure of the display panel after integration.

Further, the optical fingerprint sensing elements 1011 may be configured only in a portion of the self-luminous display pixels 101 rather than all the self-luminous display pixels 101. Specifically, one optical fingerprint sensing element 1011 is configured in one self-luminous display pixels 101 in every group of 2 by 2 self-luminous display pixels 101. As the optical fingerprint sensing elements 1011 are not configured in all the self-luminous display pixels 101, process cost may be saved and structures may be simplified. Besides, by disposing the optical fingerprint sensing elements 1011 only in a portion of the self-luminous display pixels 101, display effect of the display panel may be better, that is, the display function of the display panel may be better. Besides, with decreased optical fingerprint sensing elements, a fingerprint image acquisition rate may be improved, and power consumption may be lower.

In some embodiments, when the optical fingerprint sensing elements are configured only in a portion of the self-luminous display pixels, an area of the self-luminous display pixel may be smaller than 30 μm by 30 μm. In other words, when an area of the self-luminous display pixel is smaller than 30 μm by 30 μm, the optical fingerprint sensing elements may be disposed only in a portion of the self-luminous display pixels. The reasons lie in that, a distance between lines of a human fingerprint is generally about 200 μm, and compactly arranged optical fingerprint sensing elements do not have any advantages. There are two essential requirements in fingerprint image acquisition. First, a resolution of the image (i.e., a pixel of an optical fingerprint sensor) cannot be too great. In the embodiments, the self-luminous display pixels including the optical fingerprint sensing elements are also pixels of an optical fingerprint sensor, that is, the optical fingerprint sensor is integrated in the display panel. Second, an acquisition area should be large enough. That is, a fingerprint image to be acquired should have a certain area, so as to obtain enough fingerprint information. Therefore, an area of the pixel of the optical fingerprint sensor (i.e., the self-luminous display pixel) may be within a range from 30 μm by 30 μm to 70 μm by 70 μm. If the area of the pixel is too large, the resolution of the image may be too small to be used in fingerprint recognition. If the area of the pixel is too small, the resolution of the image may be better, but effect of fingerprint recognition may not be improved obviously. Besides, when an area of the fingerprint image does not change, data amount of the fingerprint image may be increased with a smaller pixel area, thus, an image acquisition time may be prolonged, acquisition power of the optical fingerprint sensor is increased, and subsequent image processing time may also be prolonged.

Further, the self-luminous display pixels are generally arranged compactly, and only some conductive wires are disposed between adjacent self-luminous display pixels. When the area of the self-luminous display pixel is smaller than 30 μm by 30 μm, if the optical fingerprint sensing elements are disposed in all the self-luminous display pixels, the distribution of the optical fingerprint sensing elements may be too compact, which may increase difficulty in design and process. Therefore, in some embodiments, at least one optical fingerprint sensing element is configured in each pixel among k self-luminous display pixels in every group of in by n self-luminous display pixels, where k is any integer from 1 to m by n, and less than m by n. In this way, the number of the optical fingerprint sensing elements is less than the number of the self-luminous display pixels, which may reduce difficulty in design and process, and process cost.

In some embodiments, in the optical fingerprint sensing region, at least one optical fingerprint sensing element is configured in each pixel among k self-luminous display pixels in every group of m by n self-luminous display pixels, and when k is 1 (that is, at least one optical fingerprint sensing element is configured in one self-luminous display pixel in every group of m by n self-luminous display pixels), m and n are any integers greater than 1. In an embodiment, both m and n are 2, and k is 1. Other embodiments are possible. In some embodiments, in the optical fingerprint sensing region, at least one optical fingerprint sensing element is configured in each pixel among k self-luminous display pixels in every group of m by n self-luminous display pixels, and at least one of in and n is greater than 1, and k is less than m by n. In this way, multiple optical fingerprint sensing elements are disposed in the multiple self-luminous display pixels in array, to realize well integration of a fingerprint recognition function and a display function.

Figure 2:
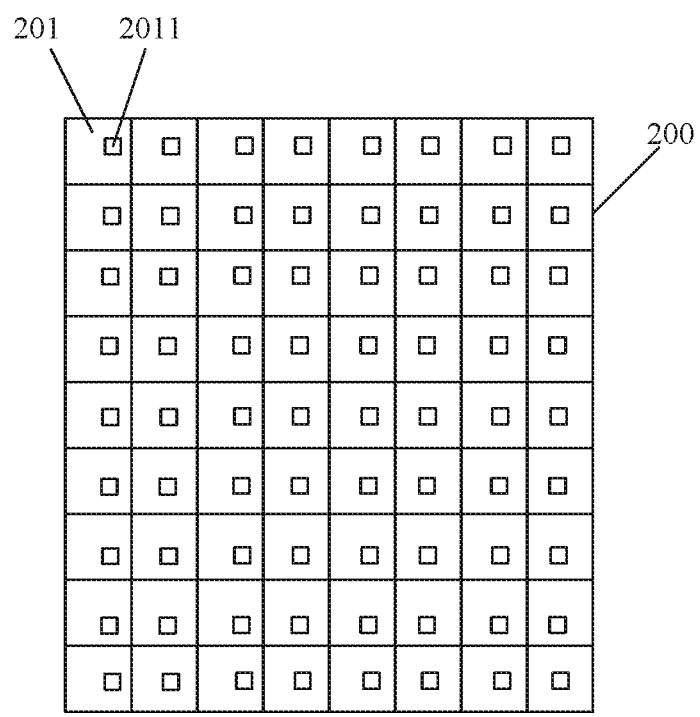
FIG. 2 schematically illustrates a diagram of a display panel according to an embodiment.

In an embodiment, a display panel is provided. Referring to FIG. 2, the display panel includes a display region 200 which includes one optical fingerprint sensing region (not labeled in FIG. 2). In some embodiments, an area of the optical fingerprint sensing region may be equal to an area of the display region 200. That is, a region where the display region 200 is located is that where the optical fingerprint sensing region is located.

Still referring to FIG. 2, the display region 200 includes a plurality of self-luminous display pixels 201 arranged in array. That is, the optical fingerprint sensing region includes a plurality of self-luminous display pixels 201 arranged in array. Referring to FIG. 2, each self-luminous display pixel 201 includes one optical fingerprint sensing element 2011.

In some embodiments, each self-luminous display pixel 201 may be a single pixel, that is, the self-luminous display pixel 201 may not include a sub-pixel.

In some embodiments, each self-luminous display pixel may include multiple sub-pixels.

In some embodiments, an area of the self-luminous display pixel may be within a range from 30 μm by 30 μm to 70 μm by 70 μm. Fingerprint recognition requires a distance between the optical fingerprint sensing elements to be within a range from 30 μm to 70 μm. If the distance is too long, the resolution of the image may be too small to be used in effective fingerprint recognition. If the distance is too short, difficulty in manufacturing may be increased, and data amount of the fingerprint image may be too large to result in calculation redundancy. More reasons can be found in the above descriptions.

Figure 3:
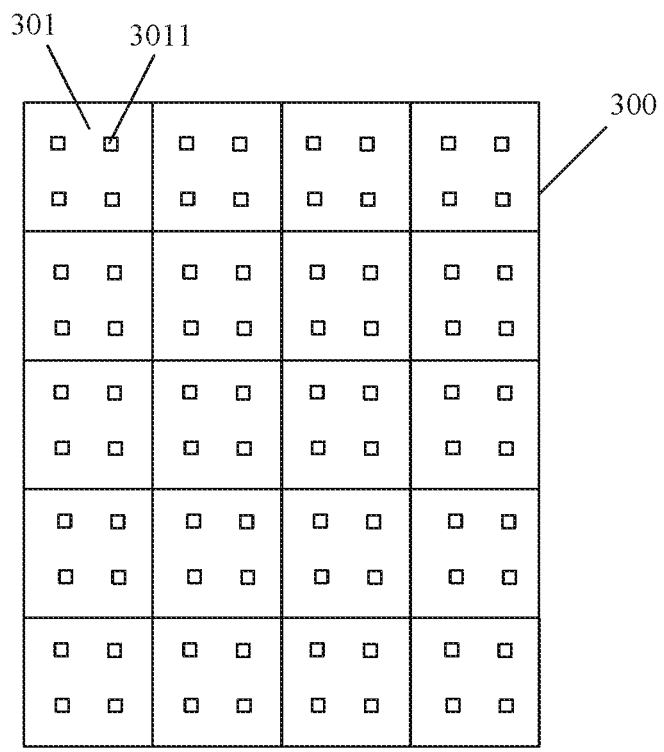
FIG. 3 schematically illustrates a diagram of a display panel according to an embodiment.

In an embodiment, a display panel is provided. Referring to FIG. 3, the display panel includes a display region 300 which includes one optical fingerprint sensing region (not labeled in FIG. 3). In some embodiments, an area of the optical fingerprint sensing region may be equal to an area of the display region 300. That is, a region where the display region 300 is located is that where the optical fingerprint sensing region is located.

Still referring to FIG. 3, the display region 300 includes a plurality of self-luminous display pixels 301 arranged in array. Each self-luminous display pixel 301 includes four optical fingerprint sensing elements 3011.

In some embodiments, each self-luminous display pixel 301 may be a single pixel, that is, the self-luminous display pixel 301 may not include a sub-pixel.

In some embodiments, each self-luminous display pixel may include multiple sub-pixels.

In some embodiments, as each self-luminous display pixel 301 includes four optical fingerprint sensing elements 3011, an area of each self-luminous display pixel 301 may be relatively large. Specifically, the area of the self luminous display pixel 301 may be 200 μm by 200 μm. The area of the self-luminous display pixel 301 may be suitable for display requirements. When a product requires a lower display resolution, a relatively large pixel area may be set. When the pixel area is 200 μm by 200 μm, four optical fingerprint sensing elements 3011 are disposed in each self-luminous display pixel 301 to ensure that a fingerprint recognition function has sufficient resolution to realize effective recognition of fingerprint.

In some embodiments, when the area of the self-luminous display pixel is larger than 70 µm by 70 µm, in the optical fingerprint sensing region, at least two optical fingerprint sensing elements are configured in each pixel among k self-luminous display pixels in every group of m by n self-luminous display pixels, and k is m by n (for example, m, n and k are 1). In this way, in the optical fingerprint sensing region, adjacent optical fingerprint sensing elements have a suitable interval, that is, all the optical fingerprint sensing elements have an efficient resolution, so that a fingerprint recognition function and a display function of the display panel can operate normally.

In some embodiments, when the area of the self-luminous display pixel is larger, each self-luminous display pixel may include eight optical fingerprint sensing elements.

From above, in the display panel, a plurality of optical fingerprint sensing elements 3011 are configured in each self-luminous display pixel 301, so as to make an area of a pixel of an optical fingerprint sensor (the optical fingerprint sensor is a virtual concept as the optical fingerprint sensor is integrated in the display panel, and a structure in the display panel which has the fingerprint recognition function may be considered as the optical fingerprint sensor) small enough when an area of the self-luminous display pixel 301 is relatively large to make acquired fingerprint images have a relatively great resolution, which ensures an effective fingerprint recognition function, and enables well cooperation of the fingerprint recognition function and the display function.

Figure 4:
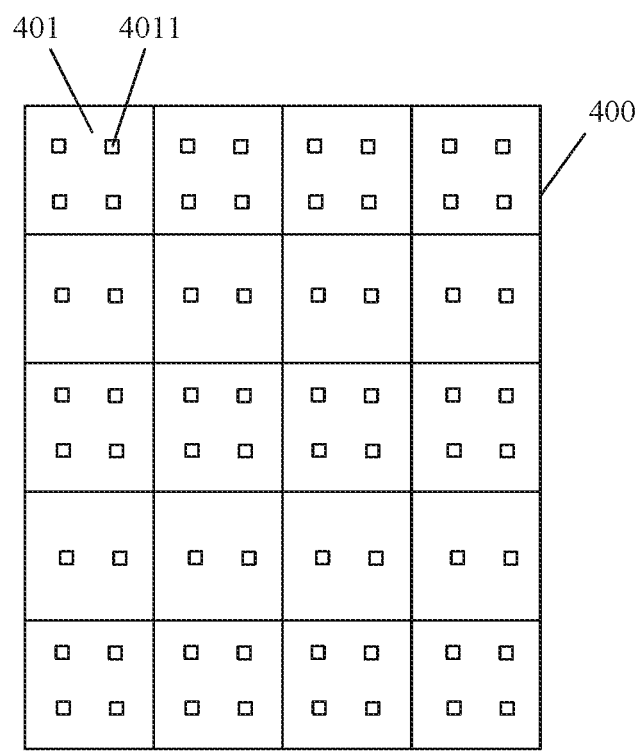
FIG. 4 schematically illustrates a diagram of a display panel according to an embodiment.

In an embodiment, a display panel is provided. Referring to FIG. 4, the display panel includes a display region 400 which includes one optical fingerprint sensing region (not labeled in FIG. 4). In some embodiments, an area of the optical fingerprint sensing region may be equal to an area of the display region 400. That is, a region where the display region 400 is located is that where the optical fingerprint sensing region is located.

Still referring to FIG. 4, the display region 400 includes a plurality of self-luminous display pixels 401 arranged in array. Each self-luminous display pixel 401 in an odd-numbered row includes four optical fingerprint sensing elements 4011, and each self-luminous display pixel 401 in an even-numbered row includes two optical fingerprint sensing elements 4011.

In some embodiments, each self-luminous display pixel 401 may be a single pixel, that is, the self-luminous display pixel 401 may not include a sub-pixel.

In some embodiments, each self-luminous display pixel may include multiple sub-pixels.

In some embodiments, the self-luminous display pixels 401 in different rows may include different numbers of optical fingerprint sensing elements 4011. From the whole optical fingerprint sensing region, the optical fingerprint sensing elements 4011 are arranged relatively uniformly.

In some embodiments, when the area of the self-luminous display pixel is larger than 70 µm by 70 µm, in the optical fingerprint sensing region, at least two optical fingerprint sensing elements are configured in each pixel among k self-luminous display pixels in every group of in by n self-luminous display pixels, and k is m by n (for example, m, n and k are 1). Further, the k self-luminous display pixels may include different numbers of optical fingerprint sensing elements, so as to provide more space for design of the optical fingerprint sensing elements in the display region.

Figure 5:
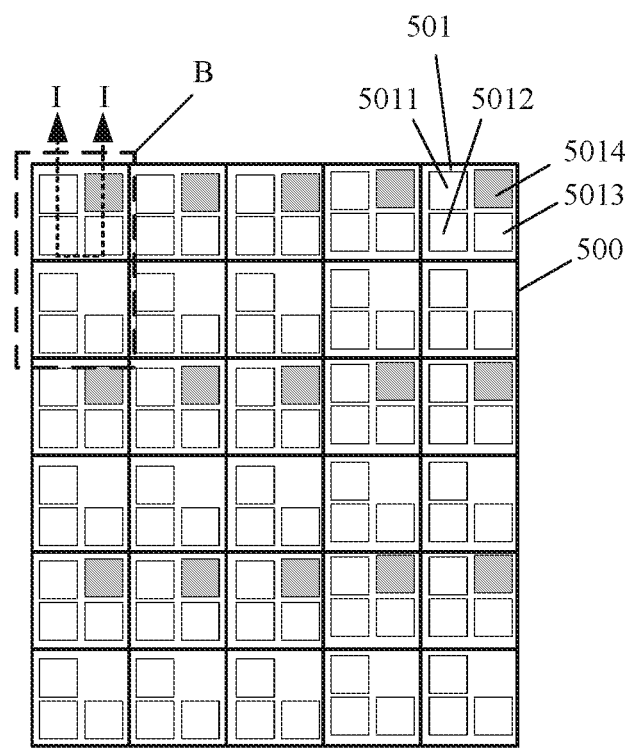
FIG. 5 schematically illustrates a diagram of a display panel according to an embodiment.
Figure 6:
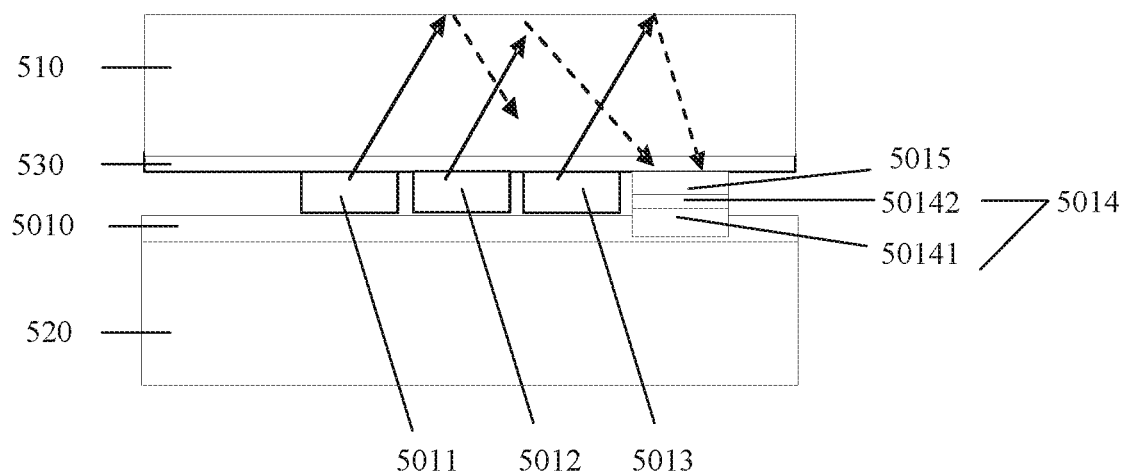
FIG. 6 schematically illustrates a sectional view of the display panel along an I-I broken line as shown in FIG. 5.

In an embodiment, a display panel as shown in FIGS. 5 and 6 is provided.

Referring to FIG. 5, the display panel includes a display region 500 which includes one optical fingerprint sensing region (not labeled in FIG. 5). In some embodiments, an area of the optical fingerprint sensing region may be equal to an area of the display region 500. That is, a region where the display region 500 is located is that where the optical fingerprint sensing region is located.

Still referring to FIG. 5, the display region 500 includes a plurality of self-luminous display pixels 501 arranged in array. Each self-luminous display pixels 501 includes three sub-pixels 5011, 5012 and 5013. One optical fingerprint sensing element 5014 is configured in one self-luminous display pixel 501 in every group of 1 by 2 self-luminous display pixels 501. In FIG. 5, a dotted box B encloses a group of 1 by 2 self-luminous display pixels 501 for highlighting.

In FIG. 5, the optical fingerprint sensing elements 5014 are disposed outside the sub-pixels 5011, 5012 and 5013. The sub-pixels 5011, 5012 and 5013 and the optical fingerprint sensing element 5014 are arranged in the corresponding self-luminous display pixels 501 in a 2-by-2 matrix, which may lead to better display effect and fingerprint recognition effect.

In some embodiments, the sub-pixels and the optical fingerprint sensing element may be arranged in other ways.

From above, the optical fingerprint sensing elements 5014 are uniformly disposed in the self-luminous display pixels 501. From the whole optical fingerprint sensing region, the optical fingerprint sensing elements 5014 are arranged in array.

FIG. 6 schematically illustrates a sectional view of the display panel along an I-I broken line as shown in FIG. 5. As the I-I broken line passes each part of one self-luminous display pixel 501, FIG. 6 illustrates the sub-pixels 5011, 5012 and 5013 and the optical fingerprint sensing element 5014. As shown in FIG. 6, the optical fingerprint sensing element 5014 includes a circuit device layer 50141 and a light sensing layer 50142.

Still referring to FIG. 6, each sub-pixel structure is disposed on a display device layer 5010, and at least a portion of the circuit device layer 50141 of the optical fingerprint sensing element 5014 is disposed in the display device layer 5010 (that is, the circuit device layer 50141 may be a portion of the display device layer 5010).

The display device layer 5010, the sub-pixels 5011, 5012 and 5013, and the optical fingerprint sensing element 5014 are disposed between a first substrate 510 and a second substrate 520 including in the display panel, wherein the first substrate 510 is closer to a press surface of a user finger.

Still referring to FIG. 6, a light collimation layer 5015 is disposed on the optical fingerprint sensing element 5014. The light collimation layer 5015 may absorb at least a portion of light deviating a vertical direction and propagating from the first substrate 510 to the optical fingerprint sensing element 5014, where light propagating in a right angle or an approximate right angle (an angle difference is less than 10 degrees) is allowed to penetrate through the light collimation layer 5015 to enter the optical fingerprint sensing element 5014.

The light collimation layer 5015 may include spaced-arranged light blocking regions and light transmitting regions. The light transmitting region allows light to be transmitted in an up-down direction, and its section has a narrow and upright bar shape. That is, the light collimation layer 5015 includes the light blocking regions (for example, light blocking frames) and the light transmitting to regions (for example, light transmitting holes). As the light transmitting regions are narrow and upright, and periphery of the light transmitting regions are the light blocking regions, when light irradiates into the light collimation layer 5015, the light blocking regions may block and absorb a great amount of light deviating the vertical direction, and only light propagating in a right angle or an approximate right angle (an angle difference is less than 10 degrees) is allowed to penetrate through the light collimation layer 5015, so that the light collimation layer 5015 can achieve a light collimation function.

In some embodiments, the display panel may not include a light collimation layer.

Referring to FIG. 6, in some embodiments, a lower surface of the first substrate is provided with a touch sensing layer 530 which makes the display panel further have a finger touch sensing function.

In some embodiments, an upper surface of the first substrate may be provided with a touch sensing layer, or both the upper surface and the lower surface of the first substrate may be provided with a touch sensing layer.

In some embodiments, the display panel may not include a touch sensing layer.

In the display panel provided in the embodiments, as the optical fingerprint sensing elements 5014 are disposed only in a portion of the self-luminous display pixels 501, display effect of the display panel may be better than that in a situation that the optical fingerprint sensing elements are disposed in all the self-luminous display pixels.

In some embodiments, when the optical fingerprint sensing elements are configured only in a portion of the self-luminous display pixels, an area of each sub-pixel in the self-luminous display pixel may be smaller than 10 µm by 30 µm. In other words, when an area of each sub-pixel in the self-luminous display pixel is smaller than 10 µm by 30 µm, the optical fingerprint sensing elements may be configured only in a portion of the self-luminous display pixels. The reasons lie in that, the self-luminous display pixels are generally arranged compactly, and only some conductive wires are disposed between adjacent self-luminous display pixels. When the area of the sub-pixel is smaller than 10 µm by 30 µm, if the optical fingerprint sensing elements are disposed in all the self-luminous display pixels, the distribution of the optical fingerprint sensing elements may be too compact, which may increase difficulty in design and process. Therefore, in some embodiments, at least one optical fingerprint sensing element is configured in each pixel among k self-luminous display pixels in every group of m by n self-luminous display pixels, where k is any integer from 1 to m by n, and less than m by n. In this way, the number of the optical fingerprint sensing elements is less than the number of the self-luminous display pixels, which may reduce difficulty in design and process, and process cost.

Similar as the embodiment shown in FIG. 1, in the above embodiment, although the optical fingerprint sensing elements are configured only in a portion of the self-luminous display pixels, an equivalent resolution of the optical fingerprint sensing elements is great enough due to a small size of the sub-pixels. Therefore, acquired fingerprint images can meet requirements of fingerprint recognition. Structures and advantages of the display panel can be referred to the above descriptions of the embodiment shown in FIG. 1.

Figure 7:
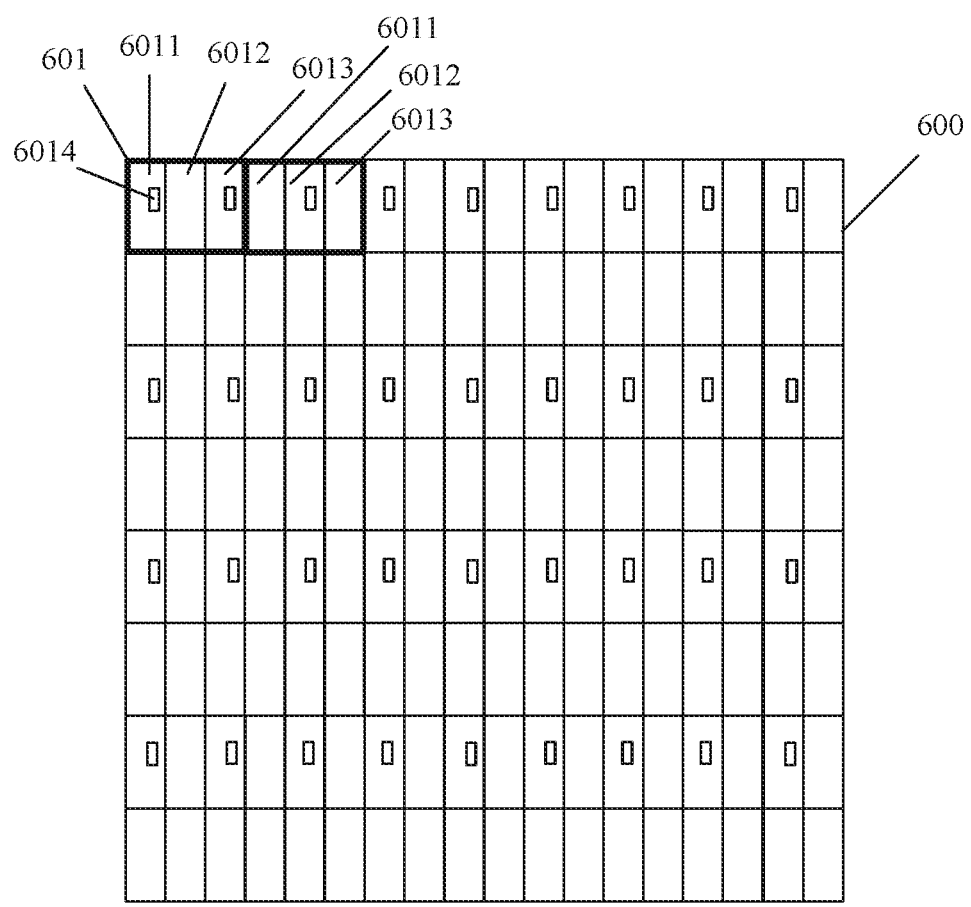
FIG. 7 schematically illustrates a diagram of a display panel according to an embodiment.

In an embodiment, a display panel as shown in FIG. 7 is provided.

Referring to FIG. 7, the display panel includes a display region 600 which includes one optical fingerprint sensing region (not labeled in FIG. 7). In some embodiments, an area of the optical fingerprint sensing region may be equal to an area of the display region 600. That is, a region where the display region 600 is located is that where the optical fingerprint sensing region is located.

Still referring to FIG. 7, the display region 600 includes a plurality of self-luminous display pixels 601 arranged in array. Each self-luminous display pixels 601 includes three sub-pixels 6011, 6012 and 6013. Among every two adjacent self-luminous display pixels 601 in an odd-numbered row, one self-luminous display pixel 601 includes two optical fingerprint sensing elements 6014, and the other self-luminous display pixel 601 includes one optical fingerprint sensing element. Two bold boxes in FIG. 7 represent one group of two adjacent self-luminous display pixels 601, and other self-luminous display pixels 601 are similar. However, the self-luminous display pixels 601 in an even-numbered row do not include any optical fingerprint sensing elements 6014.

In some embodiments, sub-pixels 6011, 6012 and 6013 are arranged in parallel. In the self-luminous display pixel 601 including two optical fingerprint sensing elements 6014, the two optical fingerprint sensing elements 6014 are disposed in the sub-pixels 6011 and 6013, respectively. In the self-luminous display pixel 601 including one optical fingerprint sensing element 6014, the optical fingerprint sensing element 6014 is disposed in the sub-pixel 6012. In this case, if the respective sub-pixels are used as independent and separate structures, the optical fingerprint sensing elements 6014 are evenly distributed among the sub-pixels in the odd-numbered rows. Specifically, in the odd-numbered rows, among every two adjacent sub-pixels, one sub-pixel includes at least one optical fingerprint sensing element 6014.

From above, the optical fingerprint sensing elements 6014 are evenly distributed among the sub-pixels of the self-luminous display pixels 601 in the display region.

In some embodiments, an area of the sub-pixel 6011, 6012 or 6013 may be smaller 10 µm by 30 µm. More details may be referred to the above descriptions of the embodiment shown in FIG. 6.

In some embodiments, when each of the self-luminous display pixels includes at least three sub-pixels and the optical fingerprint sensing elements are disposed within the sub-pixels, one optical fingerprint sensing element may be configured in each pixel among k self-luminous display pixels in every group of m by n self-luminous display pixels, where at least one of m and n is greater than 1, and k is less than m by n. In one embodiment, m and n are 2, and k is 1.

In some embodiments, when each of the self-luminous display pixels includes at least three sub-pixels and the optical fingerprint sensing elements are disposed within the sub-pixels, one optical fingerprint sensing element may be configured in each pixel among k self-luminous display pixels in every group of m by n self-luminous display pixels, where m, n and k are 1, and the area of the sub-pixel is within a range from 10 µm by 30 µm to 23 µm by 70 µm.

In some embodiments, when each of the self-luminous display pixels includes at least three sub-pixels and the optical fingerprint sensing elements are disposed within the sub-pixels, at least two optical fingerprint sensing elements may be configured in each pixel among k self-luminous display pixels in every group of m by n self-luminous display pixels, where k is equal to m by n (for example, m, n and k are 1). In this case, the area of the sub-pixel in the self-luminous display pixel may be larger than 23 µm by 70 µm. In this way, the display panel still possesses good fingerprint recognition function and display function when the area of the sub-pixel is relatively large. Further, as the area of the sub-pixel is relatively large, each self-luminous display pixel may include four or eight optical fingerprint sensing elements.

Figure 8:
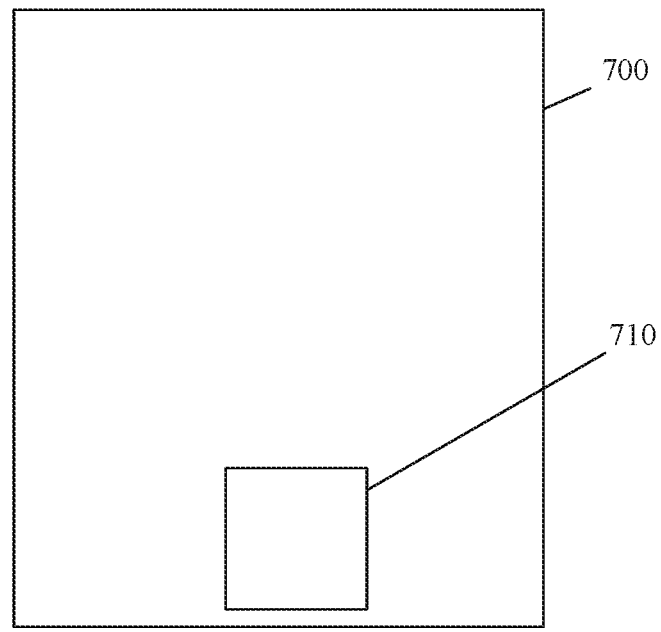
FIG. 8 schematically illustrates a diagram of a display panel according to an embodiment.

In an embodiment, a display panel as shown in FIG. 8 is provided. Referring to FIG. 8, the display panel includes a display region 700 which includes one optical fingerprint sensing region 710. In some embodiments, an area of the optical fingerprint sensing region 710 may be smaller than an area of the display region 700 (in FIG. 8, a rectangle with a larger area denotes to the display region 700, and a rectangle with a smaller area denotes to the optical fingerprint sensing region 710). That is, a region where the display region 700 is located includes a region where the optical fingerprint sensing region 710 is located and regions other than the optical fingerprint sensing region 710.

The display region 700 includes a plurality of self-luminous display pixels (not shown in FIG. 8) arranged in array. As the display region 700 includes the plurality of the self-luminous display pixels arranged in array, and the area of the optical fingerprint sensing region 710 is significantly larger than the area of the single self-luminous display pixel, the optical fingerprint sensing region 710 also necessarily includes the plurality of self-luminous display pixels arranged in array.

In the optical fingerprint sensing region 710, at least one optical fingerprint sensing element is configured in each pixel among k self-luminous display pixels in every group of m by n self-luminous display pixels, where m and n are any integers no less than 1, and k is any integer from 1 to m by n. Structures and arrangement relations of the self-luminous display pixels and the optical fingerprint sensing elements in the optical fingerprint sensing region 710 may be referred to the above descriptions of the embodiments shown in FIGS. 1 to 7 (by taking the display region in the embodiments shown in FIGS. 1 to 7 as the optical fingerprint sensing region 710 in FIG. 8).

In some embodiments, the area of the optical fingerprint sensing region 710 may be within a range from 25 mm$^2$ to 400 mm$^2$. On one hand, as recognition is performed to a human fingerprint, the area of the optical fingerprint sensing region 710 may be selected to be 5 mm by 5 mm at the minimum, to ensure that the optical fingerprint sensing region 710 can acquire a fingerprint image with a sufficiently large area to further achieve an effective fingerprint recognition function. On the other hand, as a size of a human finger is usually within a certain range, image acquisition can be performed to the entire fingerprint as long as the area of the optical fingerprint sensing region 710 reaches a certain size. If the area of the optical fingerprint sensing region 710 is further enlarged, there may be a waste. Therefore, in some embodiments, the area of the optical fingerprint sensing region 710 is smaller than 20 mm by 20 mm.

Figure 9:
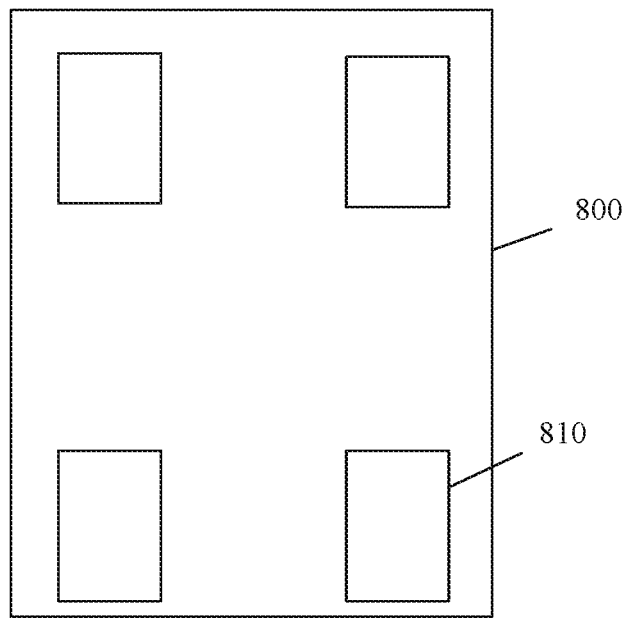
FIG. 9 schematically illustrates a diagram of a display panel according to an embodiment.

In an embodiment, a display panel as shown in FIG. 9 is provided. Referring to FIG. 9, the display panel includes a display region 800 which includes four optical fingerprint sensing regions 810. In some embodiments, an area of the optical fingerprint sensing region 810 may be smaller than an area of the display region 800 (in FIG. 9, a rectangle with a larger area denotes to the display region 800, and a rectangle with a smaller area denotes to the optical fingerprint sensing region 810). That is, a region where the display region 800 is located includes a region where the optical fingerprint sensing region 810 is located and regions other than the optical fingerprint sensing region 810.

The display region 800 includes a plurality of self-luminous display pixels (not shown in FIG. 9) arranged in array. As the display region 800 includes the plurality of the self-luminous display pixels arranged in array, and the area of the optical fingerprint sensing region 810 is significantly larger than the area of the single self-luminous display pixel, the optical fingerprint sensing region 810 also necessarily includes the plurality of self-luminous display pixels arranged in array.

In every optical fingerprint sensing region 810, at least one optical fingerprint sensing element is configured in each pixel among k self-luminous display pixels in every group of m by n self-luminous display pixels, where in and n are any integers no less than 1, and k is any integer from 1 to m by n. Structures and arrangement relations of the self-luminous display pixels and the optical fingerprint sensing elements in the optical fingerprint sensing region 80 may be referred to the above descriptions of the embodiments shown in FIGS. 1 to 7 (by taking the display region in the embodiments shown in FIGS. 1 to 7 as the optical fingerprint sensing region 810 in FIG. 9).

In some embodiments, the area of the optical fingerprint sensing region 810 may be within a range from 25 mm$^2$ to 400 mm$^2$. On one hand, as recognition is performed to a human fingerprint, the area of the optical fingerprint sensing region 810 may be selected to be 5 mm by 5 mm at the minimum, to ensure that the optical fingerprint sensing region 810 can acquire a fingerprint image with a sufficiently large area to further achieve an effective fingerprint recognition function. On the other hand, a size of a human finger is usually within a certain range. Therefore, in some embodiments, the area of the optical fingerprint sensing region 810 is smaller than 20 mm by 20 mm.

It should be noted that, in other embodiments, the display region may also include a plurality of optical fingerprint sensing regions. When including a plurality of optical fingerprint sensing regions, an area of each of the plurality of optical fingerprint sensing regions is necessarily smaller than an area of the display region, and a total area of the plurality of optical fingerprint sensing regions is still smaller than the area of the display region (as shown in FIG. 9).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A display panel, comprising:
   a display region comprising a plurality of self-luminous display pixels configured in array,
   wherein the display region comprises at least one optical fingerprint sensing region,
   wherein at least one optical fingerprint sensing element is configured in each pixel among k self-luminous display pixels in every group of m by n self-luminous display pixels in every optical fingerprint sensing region, where m and n are any integers no less than 1, and k is any integer from 1 to m by n,
   wherein an area of the optical fingerprint sensing region is smaller than an area of the display region and within a range from 25 mm$^2$ to 400 mm$^2$.

2. The display panel according to claim 1, wherein one optical fingerprint sensing element is configured in each pixel among k self-luminous display pixels in every group of m by n self-luminous display pixels, where at least one of m and n is greater than 1, k is less than m by n, and an area of the self-luminous display pixel is smaller than 30 μm by 30 μm.

3. The display panel according to claim 2, wherein both m and n are 2, and k is 1.

4. The display panel according to claim 1, wherein one optical fingerprint sensing element is configured in each pixel among k self-luminous display pixels in every group of m by n self-luminous display pixels, where m, n and k are 1, and an area of the self-luminous display pixel is within a range from 30 μm by 30 μm to 70 μm by 70 μm.

5. The display panel according to claim 1, wherein k is m by n, at least two optical fingerprint sensing elements are configured in at least one pixel among k self-luminous display pixels in every group of m by n self-luminous display pixels, and an area of the self-luminous display pixel is larger than 70 μm by 70 μm.

6. The display panel according to claim 5, wherein four or eight optical fingerprint sensing elements are configured in every pixel among k self-luminous display pixels in every group of m by n self-luminous display pixels.

7. The display panel according to claim 1, wherein each of the plurality of self-luminous display pixels comprises at least three sub-pixels, and the optical fingerprint sensing element is disposed in the sub-pixel.

8. The display panel according to claim 7, wherein one optical fingerprint sensing element is configured in every pixel among k self-luminous display pixels in every group of m by n self-luminous display pixels, where at least one of m and n is greater than 1, k is less than m by n, and an area of the sub-pixel is smaller than 10 μm by 30 μm.

9. The display panel according to claim 8, wherein both m and n are 2, and k is 1.

10. The display panel according to claim 7, wherein one optical fingerprint sensing element is configured in every pixel among k self-luminous display pixels in every group of m by n self-luminous display pixels, where m, n and k are 1, and an area of the sub-pixel is within a range from 30 μm by 10 μm to 23 μm by 70 μm.

11. The display panel according to claim 1, wherein k is m by n, at least two optical fingerprint sensing elements are configured in at least one pixel among k self-luminous display pixels in every group of m by n self-luminous display pixels, and an area of the sub-pixel is larger than 23 μm by 70 μm.

12. The display panel according to claim 11, wherein four or eight optical fingerprint sensing elements are configured in every pixel among k self-luminous display pixels in every group of m by n self-luminous display pixels.

13. The display panel according to claim 1, wherein each of the plurality of self-luminous display pixels comprises at least three sub-pixels, and the optical fingerprint sensing element is disposed outside the sub-pixel.

14. The display panel according to claim 1, wherein the display region comprises one optical fingerprint sensing region, and an area of the display region is equal to an area of the optical fingerprint sensing region.

15. The display panel according to claim 13, wherein the display region comprises one optical fingerprint sensing region, and an area of the display region is equal to an area of the optical fingerprint sensing region.

16. The display panel according to claim 1, wherein when the optical fingerprint sensing region acquires a fingerprint signal, at least a portion of the self-luminous display pixels give out light to provide light as a light source.

17. The display panel according to claim 1, further comprising a first substrate and a second substrate facing the first substrate, wherein the first substrate is closer to a press surface of a user finger, and at least one of an upper surface and a lower surface of the first substrate is provided with a touch sensing layer.

18. The display panel according to claim 1, wherein a first substrate and a second substrate facing the first substrate, wherein the first substrate is closer to a press surface of a user finger, and a light collimation layer is disposed between the first substrate and the optical fingerprint sensing element.

* * * * *